United States Patent [19]

Izawa et al.

[11] Patent Number: 5,359,369
[45] Date of Patent: Oct. 25, 1994

[54] GRADATION CORRECTING APPARATUS FOR CORRECTING GRADATION OF VIDEO SIGNALS

[75] Inventors: Yosuke Izawa, Ibaraki; Naoji Okumura, Minou, both of Japan

[73] Assignee: Matsushita Electric Industrial Co., Ltd., Osaka, Japan

[21] Appl. No.: 59,910

[22] Filed: May 10, 1993

[30] Foreign Application Priority Data

May 8, 1992 [JP] Japan ................................ 4-115697

[51] Int. Cl.⁵ .............................................. H04N 5/57
[52] U.S. Cl. ..................................... 348/672; 348/565
[58] Field of Search ................. 358/22, 183, 166, 160; 348/565, 672; H24N 5/57

[56] References Cited

U.S. PATENT DOCUMENTS

| | | | |
|---|---|---|---|
| 4,367,484 | 1/1982 | Kuroyanagi et al. | 358/22 |
| 4,578,698 | 3/1986 | Miki et al. | 358/22 |
| 4,855,825 | 8/1989 | Santamaki et al. | 358/136 X |
| 5,239,378 | 8/1993 | Tsuji et al. | 358/166 |
| 5,241,386 | 8/1993 | Tsuji et al. | 358/166 |

FOREIGN PATENT DOCUMENTS

| | | |
|---|---|---|
| 258740 | 3/1988 | European Pat. Off. |
| 393946 | 10/1990 | European Pat. Off. |
| 3-235585 | 2/1990 | Japan . |
| 4-127678 | 9/1990 | Japan . |
| 3-263984 | 3/1993 | Japan . |

*Primary Examiner*—Victor R. Kostak
*Attorney, Agent, or Firm*—Ratner & Prestia

[57] ABSTRACT

A gradation correcting apparatus, which can be effectively incorporated into various video devices, enables the display of a sub-display within the domain of main-display (i.e. Picture in Picture) and also enables automatic adjustment of each gradation of the display dependent on the characteristics of the respective input signal. By using both a window pulse and a main- and sub-display switching signal, gradation corrections of the displays are carried out such that either no gradation correction is applied to the sub-display or a proper correction is applied according only to the sub-display signal. In this apparatus, the luminance information related to the sub-display and the luminance information related to the main-display excluding that of the sub-display are independently inputted into a signal correction system, thereby allowing individual processing of this information. Moreover, since the signal delay caused by the arithmetic processing can be precisely compensated for by a delay device, the gradation corrections for the main- and sub-displays are exactly executed according to the respective luminance level information, thus realizing an easy-to-see Picture in a Picture.

9 Claims, 9 Drawing Sheets

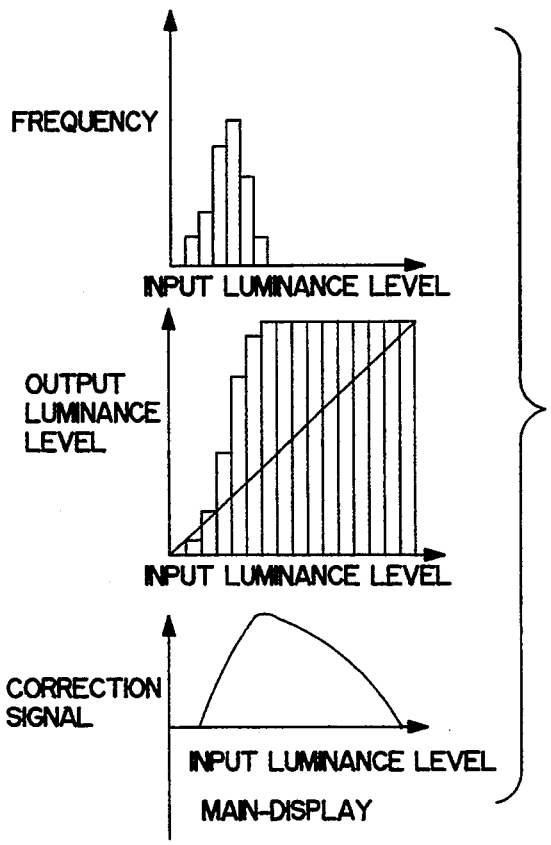
FIG. 5(a)
FIG. 5(b)
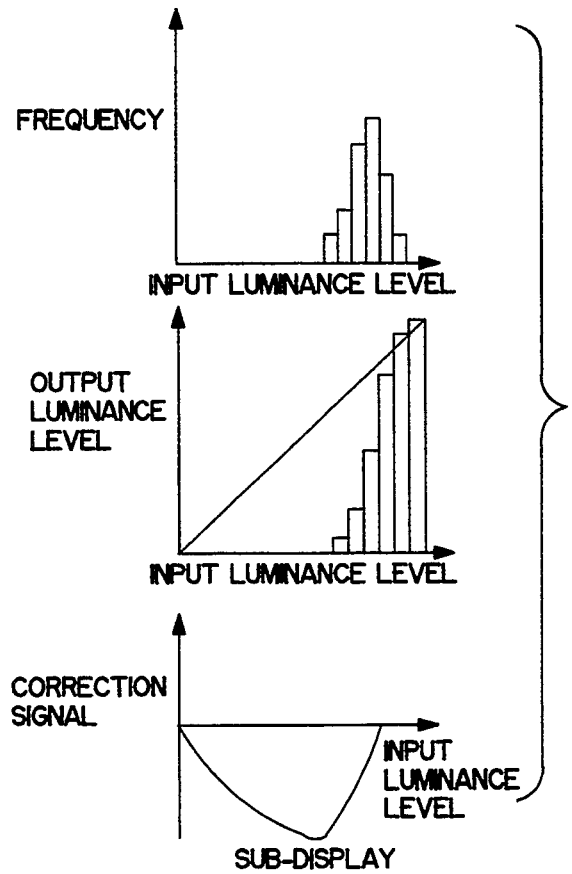
FIG. 5(c)

GRADATION CORRECTING APPARATUS FOR CORRECTING GRADATION OF VIDEO SIGNALS

BACKGROUND OF THE INVENTION (1) Field of the Invention

The present invention relates to a gradation correcting apparatus by which the gradation of video signals of such devices as television receivers, video-tape recorders, video projectors or others are automatically corrected at the optimum level according to the characteristics of the input image. More specifically, this invention relates to a gradation correcting apparatus which can be effectively incorporated into various video devices in order to display a small sub-display screen area, such as window, on the main display screen area (what is called "Picture in Picture").

(2) Prior Arts

In order to improve the TV image quality, various gradation correcting apparatii dependent on the characteristics of input images had been developed. A conventional and typical gradation correcting apparatus developed in the past is described below by referring to FIGS. 6 to 8.

A block diagram a conventional gradation correcting apparatus is shown in FIG. 6 wherein timing pulse generator 1 generates window pulses by which the range of the histogram on the image screen is determined according to both the horizontal and the vertical synchronization signals.

Histogram memory 2 memorizes the distribution of luminance levels of input video signals which are in a range determined by the pulses generated by said timing pulse generator 1. Lookup table arithmetical processing circuit 3 performs accumulative additions of the histograms stored in the histogram memory 2, and normalizes each data so that the maximum accumulative frequency becomes equal to the maximum value of the output luminance signal.

Lookup table memory 4 stores the data normalized by the lookup table arithmetical processing circuit 3, and from which the correction signal according to the luminance level of input video signal is read out. Delay circuit 5 delays the input video signal, adder 6 adds the correction signals obtained by the lookup table arithmetical circuit 3 to the output of the delay circuit 5.

The operations and relationship of the above explained elements constituting the above-shown gradation correcting apparatus are explained below.

FIG. 7 illustrates a window pulse obtained by said timing pulse generator 1. When a histogram has to be taken within a domain on the screen shown in FIG. 7(a), a window signal such as shown in FIG. 7(b) is derived. FIG. 7(c) shows a horizontal partial enlargement of the signal. The sampling of the histogram is performed only when this window pulse takes a high-level.

FIG. 8 shows graphically the operations of the luminance conversion performed by the conventional apparatus. In this operation, a histogram wherein the input luminance levels are divided into suitable numbers as the one shown In FIG. 8(a), is produced.

The frequency distributions of the divided luminance levels are stored in the histogram memory 2 while the content of the memory is reset at a predetermined interval in order to reset the previously stored data. This interval is generally set at an interval which equals a single vertical scanning period or an integer multiple.

Then, the lookup table arithmetical processing circuit 3 performs an accumulation of the histogram data, and it derives a normalizing coefficient which makes the accumulated maximum value equal to the maximum value of the output luminance level, and the processing circuit multiplies each data of the accumulative histogram to the derived normalizing coefficient. The results of this are stored in the lookup table 4.

FIG. 8(b) shows these operations. Thee content of the lookup table memory 4 is read out according to the luminance level of the input signal, and, as shown in FIG. 8(c), the difference between the output and input luminance levels is outputted as a correction signal. The correction of the gradation is then performed by adding the correction signal to the input signal which is delayed by means of the delay circuit 5 using the adder 6.

However, a below-described problem is inevitable with the gradation correcting apparatus construction shown above when it is incorporated in a TV showing double displays such as the one shown In FIG. 9(a) (what is called "Picture in Picture") wherein a sub-display signal is added to a main display signal.

When the main-display is showing a low luminance scene while the sub-display is showing a high luminance scene, the distribution of the accumulative histogram stored in the lookup table contains a considerably high proportion of the low luminance components, as shown in FIG. 9(d).

Therefore, the correction signal will take such a form shown in FIG. 9(e). Thus, the correction is made to bring the luminance of the sub-display toward a higher level, and therefore, the luminance of the sub-display of which luminance level was originally high will be corrected toward a still higher level, bringing a definitely undesirable TV-viewing condition.

SUMMARY OF THE INVENTION

The object of the present invention relates to a gradation correcting apparatus capable of performing the optimum gradation correction dependent on the characteristics of the input signal, when the input video signal is a composite video signal consisting of main- and sub-display signals.

In other words, the gradation of the sub-display can be corrected to an improved viewing condition by utilizing a main- and sub-display switching signal shown In FIG. 9(c) which is outputted in synchronization with the sub-display signal.

The gradation correcting apparatus of the present invention comprises:

a timing pulse generating means generating window pulses by which a predetermined display domain of the input video signal is derived from both the horizontal and vertical synchronizing signals of the input video signal;

a first switching means differentiating said predetermined display domain from the sub-display domain by using the window pulse and the main- and sub-display switching signal which is a control signal to generate the sub-display within said predetermined display domain;

a histogram memory storing the luminance levels according to the output of the first switching means in order to generate the histogram;

a correction signal output means generating the correction signal according to the histogram;

a delay means delaying both the input video signal and the main- and sub-display switching signal for a predetermined period;

a second switching means switching the correction signals inputted by using the main- and sub-display switching signal which is delayed by the delay means; and an adding means adding the output of the second switching means to the input video signal which is delayed by said delay means; wherein the output of said adding means is utilized as an output of the Input video signal of which gradation is to be corrected.

The signals of the main-display and the sub-display can be accurately separated by using said timing pulse generating means generating the window pulses and the first switching means using the window pulses and the main- and sub-display switching signals. Furthermore, based on the separated signals, a histogram of the luminance levels is produced in the histogram memory.

Since the luminance information of the sub-display disposed within the main-display and the luminance information of the main-display excluding the sub-display are independently inputted to the correction signal outputting means, the arithmetical processing of the information including the mutual relationship between these two displays can be performed, and as the result of this, the correction signal can be produced.

Moreover, after the signal delay caused by the arithmetic processing is compensated by said delay means, the correction signal is composited with the Input video signal by means of the second switching means and the adding means.

By means of thus produced composite signal, the gradation correction of the Input video signal can be preformed according to the respective luminance level information of the main- and sub-displays. In addition to this, since the gradation correction of the same can be performed at the precise timing by means of the delay means, an easy-to-see sub-display can be produced.

Moreover, since the histogram memory stores the luminance levels of the input video signal representing either the sub-display domain or the predetermined domain excluding the sub-display domain according to the output of the first switching means in producing the histogram, the gradations of these two domains can be corrected independently, preventing possible interferences between these two domains.

Furthermore, the correction signal output means is constituted of said lookup table arithmetical processing means which sequentially accumulates the frequencies of the luminance levels stored in the histogram memory and normalizes the maximum accumulated frequency so that it becomes equal to the maximum value of the output luminance signal, and the lookup table memory which memorizes the output of the lookup table arithmetical processing means, and produces simultaneously a correction signal from the difference between the output and the luminance level of the output luminance signal. Therefore, the correction signal precisely matched to the predetermined luminance level of the output luminance signal can be produced.

Furthermore, the construction of the invented gradation correcting apparatus can be highly simplified by employing an interlocking switching circuit capable of switching the first and the second switching means simultaneously.

BRIEF DESCRIPTION OF THE DRAWINGS

FIG. 5(a) is a waveform showing an example of the main-and sub-display switching signal. FIG. 5(b) shows histograms of the frequencies of the input luminance level and the normalized output luminance level of the main display. This shows also a correction signal outputted according to the histograms. FIG. 5(c) shows a histogram of the frequencies of the input luminance levels and the normalized output luminance levels of the sub-display, and, at the same time, a correction signal outputted according to the histogram.

DETAILED DESCRIPTION OF THE INVENTION

Figure 1:
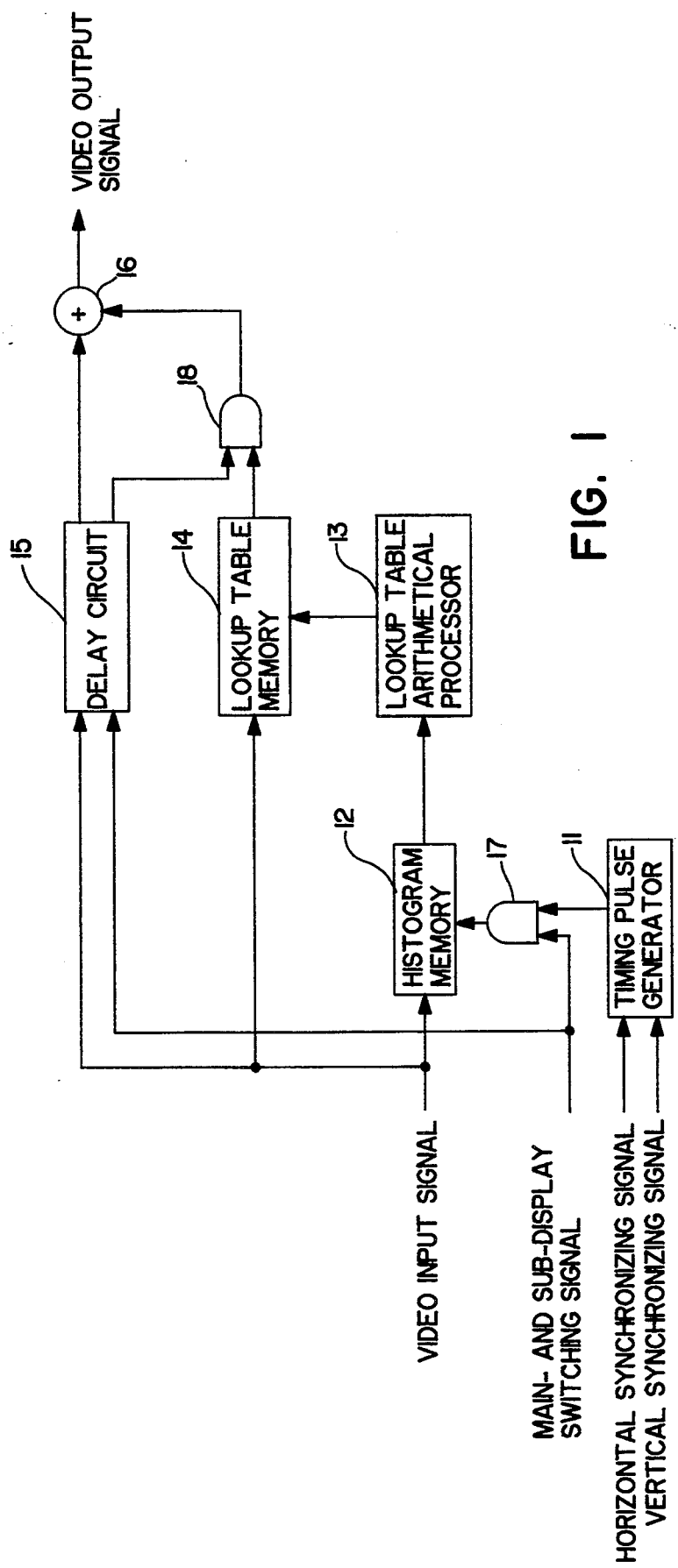
FIG. 1 is a block diagram of the gradation correcting apparatus showing a first exemplary embodiment or the invention.

An exemplary embodiment of the invention is now explained by referring the attached drawings. FIG. 1 is a block diagram showing the construction of the gradation correcting apparatus of the first exemplary embodiment.

In FIG. 1, timing pulse generator 11 produces window pulses from both the horizontal and vertical synchronization signals, first AND circuit 17 as a first switching means, deriving the AND between the window pulse and the main- and sub-display switching signal.

Histogram memory 12 derives the histogram of gradation by storing the luminance levels of the input video signal according to the output of the first AND circuit 17, and lookup table arithmetical processing circuit 13 normalizes the maximum accumulated frequency in order to make coincide this with the maximum value of the output luminance signal.

Lookup table memory 14 stores the normalized data and outputs the correction signals. Therefore, the correction signal output means is constituted of the look-up table arithmetical processing circuit 13 and the lookup table memory 14.

Delay circuit 15, as a delay means, delays both the input video signal and the main-and sub-display switching signal. Second AND circuit 18 as the second switching means, derives the AND between the delayed main- and sub-display switching signal and the correction signal outputted at the lookup table memory 14. Adder 16, as the adding means, adds the output of the second AND circuit 18 to the input signal delayed by the delay circuit 15.

The relationship between these constituting elements of the gradation correcting apparatus and the operation of these are now explained by referring to FIGS. 2 and 3.

Figure 2A:
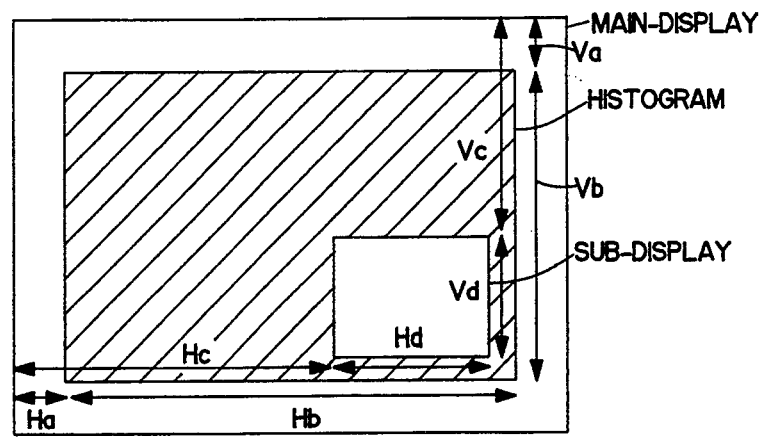
FIG. 2(a) shows a typical display screen produced by applying the first exemplary embodiment, and this shows also a pattern explaining a domain range from which the histograms are taken.
Figure 2B:
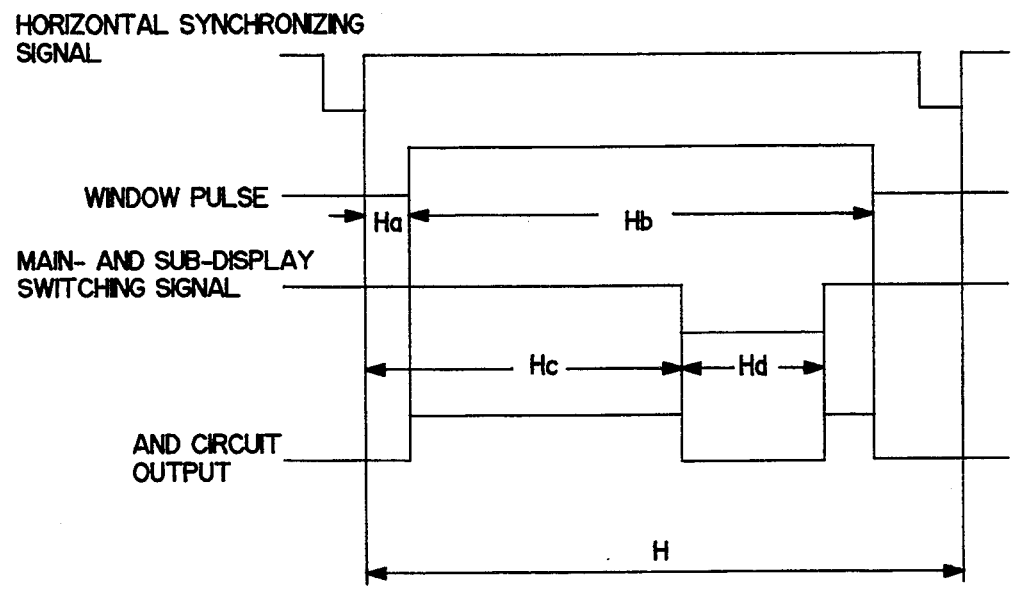
FIG. 2(b) shows a waveform explaining the operation at the horizontal rate obtained by applying the first exemplary embodiment of the invention.

As shown in FIG. 2(b), a window pulse is produced by the timing pulse generator 11, and an AND of the window pulse and the main- and sub-display switching signal is produced by the first AND circuit 17.

This means that the sampling of histogram is performed when both the window pulse and the main- and sub-display switching signal are in a high-level. And by this, as shown in FIG. 2(a), the histogram of the display domain (shown by the hatched lines) excluding the sub-display domain can be derived.

That is, the luminance levels of the input video signal are stored in the histogram memory 12 according to the output of the first AND circuit 17 in order to derive the histogram of the gradation. The histograms are then stored in the lookup table arithmetical processing circuit 13, and these values are normalized so that the maximum accumulated frequency becomes equal to the maximum value of the output luminance signal.

The normalized data is stored in the lookup table memory 14, and the output of the memory 14 becomes available as the correction signal.

Then, the Input signal and the main- and sub-display switching signal are delayed for a certain period In order to conduct the arithmetical processing by using the delay circuit 15. The correction signal at the sub-display domain is set at zero by deriving the AND of the correction signal and the delayed main- and sub-display switching signal by means of the second AND circuit 18.

These relationship for the horizontal rate is shown in FIG. 2(b) wherein the output of the second AND circuit 18 is set at zero during the period of lid of the main- and sub-display switching signal (or the period of the sub-display).

Thus, an appropriate correction according to the histogram of the main display can be given to the main display by adding the output of the second AND circuit 18 to the delayed Input video signal by means of the adder 16, and the output signal maintaining the sub-display at its uncorrected state can be obtained.

As above explained, according to the embodiment of the invention, the sub-display held as it is can be outputted because it is made independent of the gradation correction given to the main-display. This is obtained by combining the window pulse and the main- and sub-display switching signal. Therefore, as a result the gradation correction makes the sub-display caster to view.

Figure 3A:
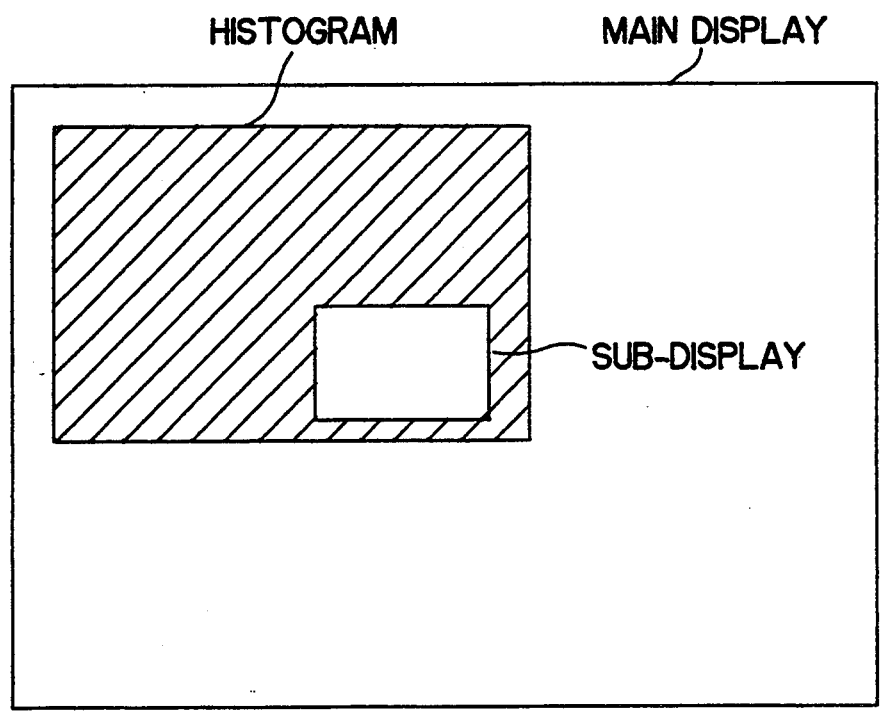
FIG. 3(a) shows another example of the video signal display produced by applying the first exemplary embodiment of the invention, and this also shows a pattern explaining a domain range from which the histograms are taken.
Figure 3B:
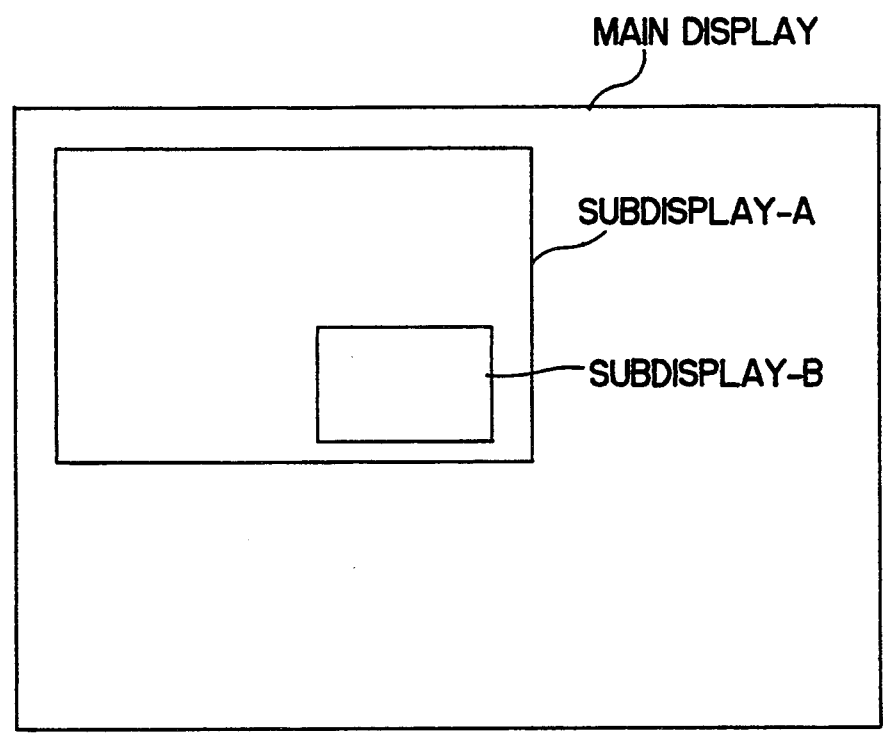
FIG. 3(b) is to show a pattern explaining the relationship between the main- and sub-displays.

A case of the Input video signal by which the display shown in FIG. 3(b) is produced, is now explained below. As shown In FIG. 3(b), this is a case where a sub-display-B is additionally provided within the domain of the sub-display-A which is within the domain of main display. As shown in FIG. 3(a), the histogram of the domain (the hatched area) excluding the domain of sub-display-B can be obtained by setting the sub-display-A within the window pulse period Hb.

As shown here, since the sub-display-B as it is can be obtained by setting the window pulse at a state to obtain a histogram of the surrounding domain of the sub-display-B, the gradation correction which makes the sub-display easier to see can be obtained as the result or this.

When the domains of plural sub-displays are overlapped as shown in this case, the same advantage obtained in the above can be obtained by setting the predetermined domain at the peripheral of the sub-display.

Figure 4:
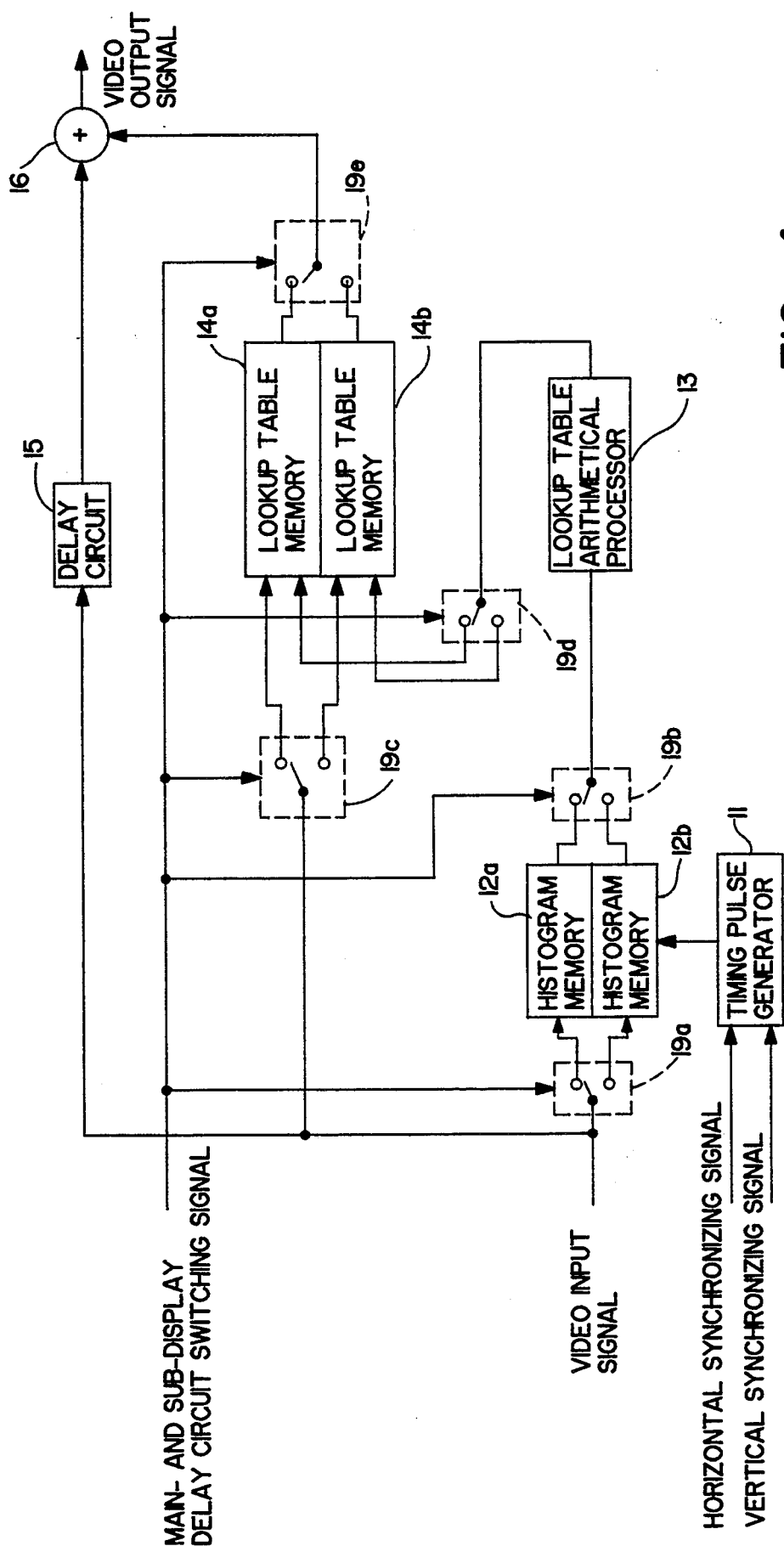
FIG. 4 is a block diagram showing the construction of the gradation correcting apparatus of the second exemplary embodiment of the invention.
Figure 6:
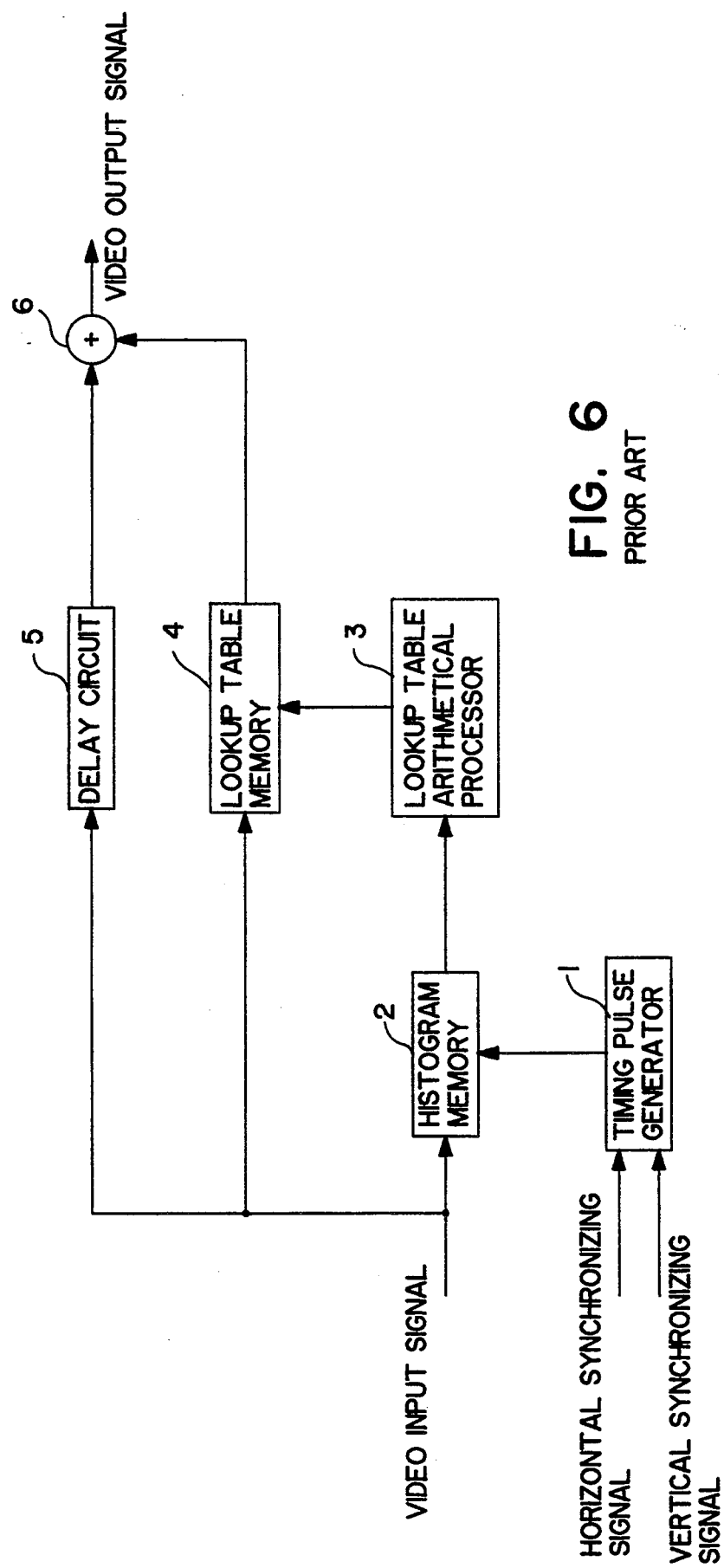
FIG. 6 is a block diagram showing the construction of a conventional gradation correcting apparatus.
Figure 7A:
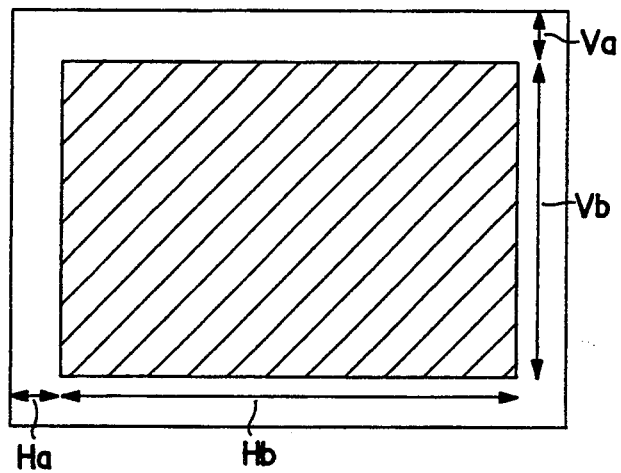
FIG. 7(a) shows an example of the display produced by applying the conventional gradation correcting method.
Figure 7B:
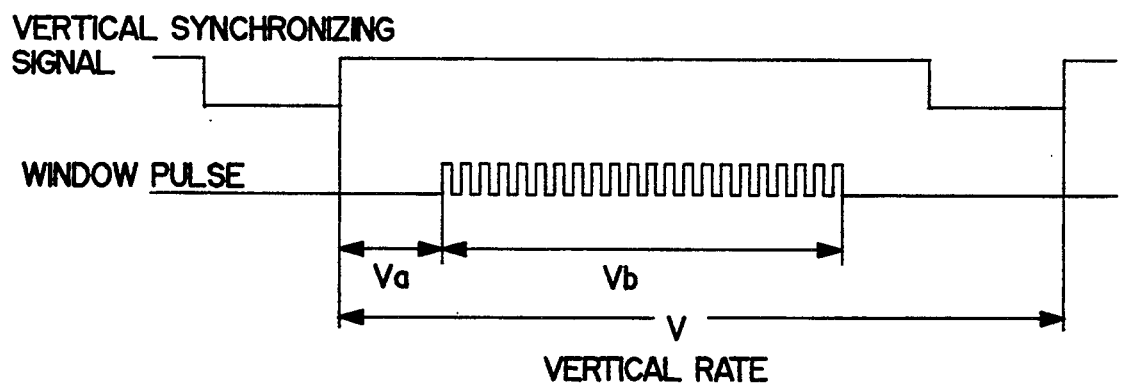
FIG. 7(b) shows a waveform to explain the operation of the gradation correction at a vertical rate obtained by applying the conventional gradation correction method.
Figure 7C:
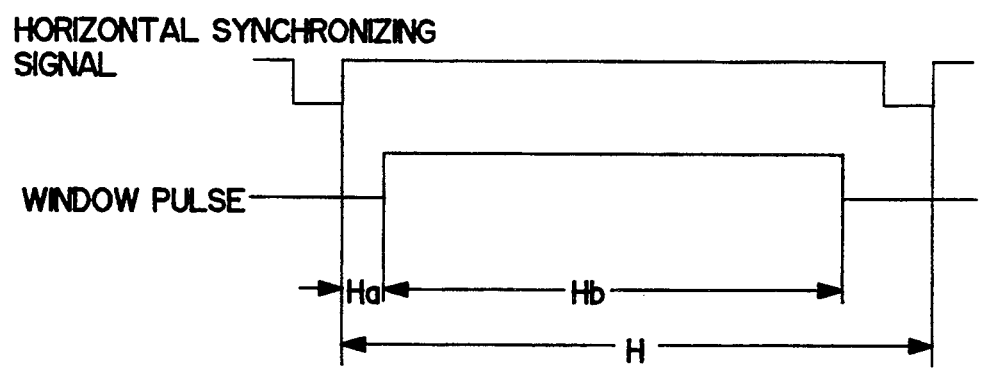
FIG. 7(c) shows a waveform to explain the operation at a horizontal rate obtained by applying the conventional gradation correction method.
Figure 8A:
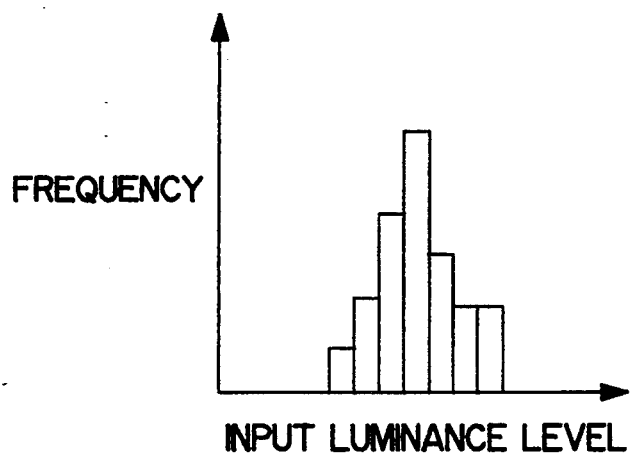
FIG. 8(a) shows a histogram of the luminance, levels of the input signal on the main-display.
Figure 8B:
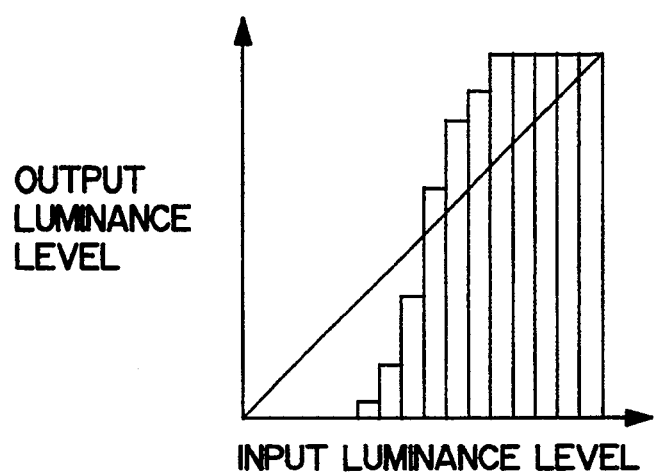
FIG. 8(b) shows a histogram of the output luminance levels normalized for each input luminance level on the main-display.
Figure 8C:
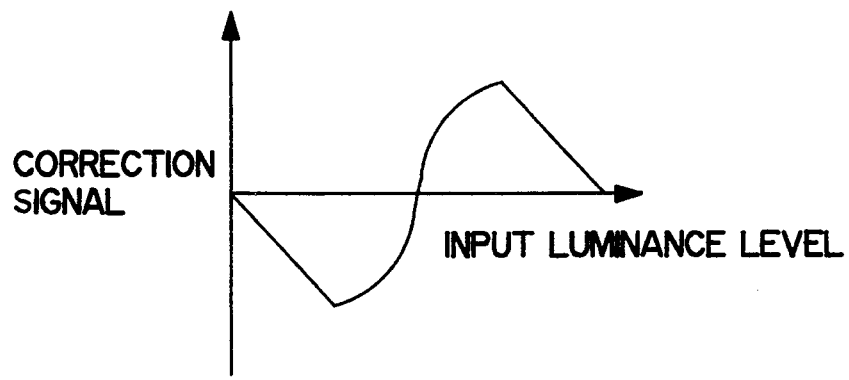
FIG. 8(c) shows a graph of the correction signals outputted according to the histograms.
Figure 9A:
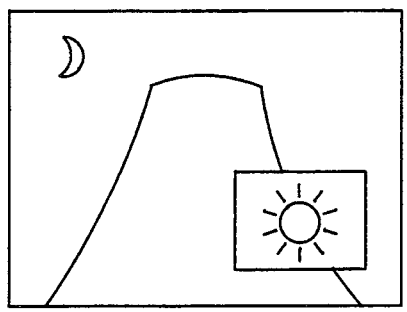
FIG. 9(a) shows a typical display pattern on the double display TV of the conventional construction.
Figure 9B:
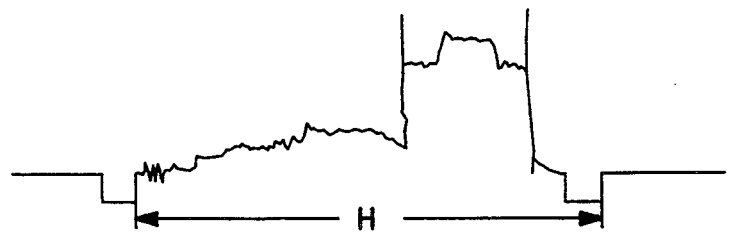
FIG. 9(b) shows a waveform of video signal at the horizontal rate obtained by the conventional gradation correcting apparatus.
Figure 9C:
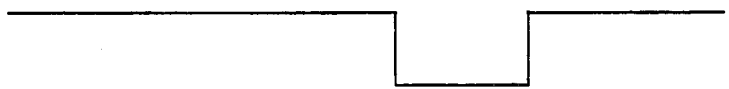
FIG. 9(c) shows a waveform of the main- and sub-display switching signal at the horizontal rate obtained by the conventional correcting apparatus.
Figure 9D:
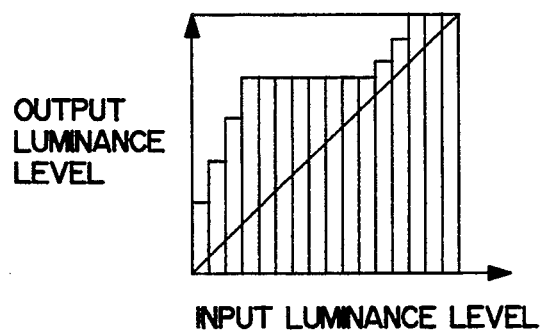
FIG. 9(d) shows a histogram of the output luminance level which Is normalized for every input luminance level on the double-display TV.
Figure 9E:
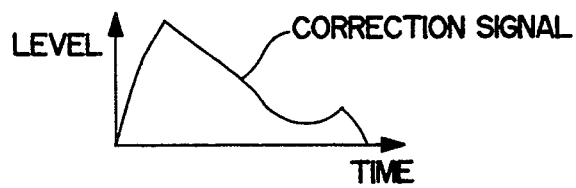
FIG. 9(e) shows a waveform of the correction signal outputted according to the histograms.

The second exemplary embodiment or the gradation correcting apparatus is now explained. FIG. 4 is a block diagram showing the construction of a second exemplary gradation correcting apparatus.

In FIG. 4, timing pulse generator 11 generates window pulses from the horizontal and vertical synchronization signals of the input video signal. Quintuple-ganged switch 19 switches the five memories simultaneously by means of the main- and sub-display switching signal. Histogram memory 12 stores the histograms of the luminance levels of main- and sub-displays are independently.

Lookup table arithmetical processing circuit 13 accumulatively stores the histograms and normalizes the maximum accumulated frequency so that the frequency thereof becomes equal to the maximum value of the output luminance signal. Lookup table memory 14 stores the normalized data for the main-display and the sub-display independently,.and outputs the correction signal. Delay circuit 15 delays the input video signal, and adder 16 adds the correction signal to the delayed input video signal. It should be noted that although a correction of the main-and sub-display switching signal by using a delay circuit may be desirable, the boundaries generated by the gradation processing can be made less conspicuous by employing the simple and practical embodiment shown in FIG. 4.

The relationship between these above-explained elements of the gradation correcting apparatus and the operation of these are now explained below by referring FIG. 5. Like the first exemplary embodiment, the window pulse is generated by the timing pulse generator 11.

However, the difference from the first exemplary embodiment is that five switches 19a to 19e incorporated within the quintuple-ganged switch 19 are simultaneously switched by the main- and sub-display switching signal so that the histogram memory 12 and the lookup table memory 14 are switched to the main-display and the sub-display independently.

That is, the quintuple-ganged switch 19 consists of two switches 19a and 19c which switch two respective inputs to the histogram memories 12a and 12b, and the lookup table memories 14a and 14b, two switches 19b and 19e which switch two respective outputs from the histogram memories 12a and 12b, and the lookup table memories 14a and 14b, and the switch 19d which connects the output of the lookup table arithmetical processing circuit 13 to either of the two inputs of the lookup table memories, 12a or 12b.

Thus, the period of the sub-display is switched to use both the histogram memory 12a for the sub-display and the lookup table memory 14a by means of the main- and sub-display switching signal as shown In FIG. 5(a). The period of the other is switched to use the histogram memory 12b for the main-display and the lookup table memory 14b.

FIG. 5(b) shows the operation which takes place during the period or the main-display. FIG. 5(b) also shows a graph of the frequencies of the input luminance level histogram produced by the histogram memory 12b, plotted against the input luminance levels. The two frequencies are Individually accumulated for each luminance level, and the graph of the frequencies is normalized so that the maximum accumulated frequency becomes equal to the maximum value of the output luminance signal.

The normalized data is, then stored in the lookup table memory 14b, and a correction signal becomes available as the output: of the lookup table memory 14b.

Likewise, the five circuits are simultaneously switched by the quin-tuplely ganged switch 19 during the period of sub-display, and, by this, a correction signal becomes available from the lookup table memory 14a as shown in FIG. 5(c). By the processes described above, the correction signals dependent on the individual scenes of the main- and sub-displays can be derived, and by this, the gradations of the main- and sub-displays are corrected at their respective optimums.

According to the second exemplary embodiment of the invention, the gradation correction of the main-display and the gradation correction of the sub-display are; independently performed according to the respective individual scenes. Therefore, both the main- and the sub-displays are corrected to show easy-to-see pictures.

As understood from the above explanations, the luminance information of the sub-display disposed within a domain of the main-display and the luminance information of the main-display excluding the domain or the sub-display are individually inputted into the gradation correcting apparatus. Therefore, the relationship between these two displays can be derived arithmetically. At the same time, since the delay of the signal caused by the arithmetical processing are compensated by the delay means, and the gradations of the main- and sub-displays are properly corrected according to the respective luminance levels so that easy-to-see sub-displays are obtained on the respective dislays.

By applying the first exemplary embodiment of the invention to an input signal comprised or a sub-display signal superposed on a main-display signal for a double-display, the histograms of the gradation of sub-display are excluded from the input, signal by utilizing the main- and sub-display switching signal outputted in synchronizing with the sub-display.

Thus, only the gradation of the main-display is corrected according to the scene shown on the main-display, and no gradation correction of the sub-display is made so that the gradation correction apparatus by which easy-to-see gradations of both the main- and sub-displays are realized.

By applying the second exemplary embodiment of the invention to an input signal comprised of a sub-display signal superposed on a main-display signal for a double-display, the histogram of gradation of sub-display and 1, he histogram of gradation of main-display are independently processed by combining the input signal with the window pulse utilizing the main- and sub-display switching signal outputted in synchronizing with the sub-display.

Thus, as a result of this, the gradation of the main-display is corrected according to the scene shown on the main-display, and the gradation of the sub-display is corrected according to the scene shown in the sub-display, so that the gradation correcting apparatus realizing easy-to-see gradations of both the main- and sub-displays is realized.

We claim:

1. A gradation correcting apparatus comprising:
    timing pulse generating means for generating window pulses, said window pulses being derived from a horizontal synchronizing signal and a vertical synchronizing signal of an input video signal;
    first switching means for producing a first control signal by using window pulses and a main- and sub-display switching signal, said main- and sub-display switching signal being a second control signal to differentiate a predetermined display domain from a sub-display domain therein;
    histogram memory for storing luminance levels according to said first control signal in order to generate a histogram;
    correction signal output means for generating a correction signal according to the histogram;
    delay means for delaying both the input video signal and the main- and sub-display switching signal for a predetermined period;
    second switching means for generating an output derived from the correction signals and the delayed main- and sub-display switching signal; and
    adding means for adding the output of the second switching means to the delayed input video signal to produce an output video signal with gradation correction.

2. A gradation correcting apparatus according to claim 1,
    wherein said histogram is produced by the histogram memory by storing, in response to the first control signal, the luminance levels of the input signal for one of the signal for the sub-display domain and the predetermined display domain excluding said sub-display domain.

3. A gradation correcting apparatus according to claim 1,
    wherein said predetermined period is equal to an amount of time required to process the video input signal by means of said histogram memory and said correction signal output means.

4. A gradation correcting apparatus according to claim 1,
    wherein the second switching means outputs the correction signal for the predetermined display domain excluding the sub-display domain, and outputs a zero correction signal for said sub-display domain.

5. A gradation correcting apparatus according to claim 1,
wherein the first and the second switching means comprise AND circuits.

6. A gradation correcting apparatus comprised of:
timing pulse generating means for generating window pulses, said window pulses being derived from a horizontal synchronizing signal and a vertical synchronizing signal of an input video signal;
first switching means for producing a first control signal by using window pulses and a main- and sub-display switching signal, said main- and sub-display switching signal being a second control signal to differentiate a predetermined display domain from a sub-display domain therein;
histogram memory for storing luminance levels according to said first control signal in order to generate a histogram;
lookup table arithmetical processing means for accumulatively storing frequencies of the luminance levels stored in said histogram memory, and for normalizing a maximum accumulated frequency with a maximum value of an output luminance signal;
lookup table memory for storing the output of said lookup table arithmetical processing means and for producing a correction signal from a level difference between the output of said lookup arithmetical processing means and the luminance level of said output luminance signal;
delay means for delaying both the input video signal and the main- and sub-display switching signal for a predetermined period;
second switching means for generating an output derived from the correction signals and the delayed main- and sub-display switching signal; and
adding means for adding the output of the second switching means to the delayed input video signal to produce an output video signal with gradation correction.

7. A gradation correcting apparatus comprised of:
timing pulse generating means for generating window pulses, said window pulses being derived from a horizontal synchronizing signal and a vertical synchronizing signal of an input video signal;
switching circuit means for generating an output to differentiate a predetermined display domain from a sub-display domain by using a main- and sub-display switching signal, said main- and sub-display switching signal being control signal used to generate the sub-display domain within said predetermined display domain;
histogram memory means for independently storing, according to said window pulses, luminance levels of the sub-display domain and luminance levels of the predetermined display domain excluding said sub-display domain, and for generating two independent histograms according to the output of said switching circuit means;
lookup table arithmetical processing means for accumulatively storing, for the respective display domains, frequencies of the luminance levels stored in said histogram memory, and for respectively normalizing a maximum accumulated frequency with a maximum value of the output luminance signal;
lookup table memory for storing respective outputs of said lookup table arithmetical processing means, and for producing respective correction signals from the level differences between the outputs of lookup arithmetical processing means and the luminance level of said output luminance signal;
delay means for delaying said input video signal for a predetermined period; and
adding means for adding the correction signals to said delayed input video signal to produce an output video signal.

8. A gradation correcting apparatus according to claim 7,
wherein said switching means is a quintuple-ganged switch which switches five circuits.

9. A gradation correcting apparatus according to claim 8,
wherein said quintuple-ganged switch comprises:
two switches for switching two respective inputs of said histogram memory and said lookup table memory;
two switches for switching two respective outputs of said histogram memory and said lookup table memory; and
one switch for switching the output of said lookup table arithmetic processing circuit to two inputs of said lookup table memory.

* * * * *

UNITED STATES PATENT AND TRADEMARK OFFICE
CERTIFICATE OF CORRECTION

PATENT NO.    : 5,359,369
DATED         : October 25, 1994
INVENTOR(S)   : Yosuke Izawa and Naoji Okumura It is certified that error appears in the above-identified patent and that said Letters Patent is hereby corrected as shown below:

In Claim 7, Column 10, line 3, after "being" insert --a--.

Signed and Sealed this

Sixth Day of June, 1995

Attest:

BRUCE LEHMAN

*Attesting Officer*     *Commissioner of Patents and Trademarks*